United States Patent
Ito et al.

(10) Patent No.: US 10,821,858 B2
(45) Date of Patent: Nov. 3, 2020

(54) FLOOR STRUCTURE FOR AUTOMOBILE

(71) Applicant: HONDA MOTOR CO., LTD., Tokyo (JP)

(72) Inventors: Atsushi Ito, Wako (JP); Maki Yamaguchi, Wako (JP); Kazuhisa Nishimura, Wako (JP); Yasunobu Kawamoto, Wako (JP); Takahiro Ando, Wako (JP); Hidenori Watanabe, Ota (JP); Susumu Nagayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 39 days.

(21) Appl. No.: 16/369,774

(22) Filed: Mar. 29, 2019

(65) Prior Publication Data
US 2019/0299824 A1    Oct. 3, 2019

(30) Foreign Application Priority Data

Mar. 29, 2018   (JP) .................................. 2018-065432

(51) Int. Cl.
*B60N 2/36* (2006.01)
*B60N 2/30* (2006.01)

(52) U.S. Cl.
CPC ............. *B60N 2/3075* (2013.01); *B60N 2/36* (2013.01)

(58) Field of Classification Search
CPC ...... B60N 2/36; B60N 2/3011; B60N 2/3013; B60N 2/3045; B60N 2/3047; B60N 2/305
USPC ............. 296/66, 65.09, 69; 297/16.2, 46, 47
See application file for complete search history.

(56) References Cited

U.S. PATENT DOCUMENTS

2002/0140270 A1    10/2002   Hoshino

FOREIGN PATENT DOCUMENTS

| DE | 3826959 A1 | * | 2/1989 | ............... B60N 2/34 |
|----|------------|---|--------|--------|
| EP | 151426 A1 | * | 8/1985 | |
| FR | 2895333 A1 | * | 6/2007 | ............... B60N 2/36 |
| FR | 2962947 A1 | | 1/2012 | |
| JP | H11-240364 A | | 9/1999 | |
| JP | 2002-283898 A | | 10/2002 | |
| JP | 2007-314061 A | | 12/2007 | |
| JP | 2011-31766 A | | 2/2011 | |
| JP | 5716605 B2 | | 5/2015 | |
| JP | 2017-206165 A | | 11/2017 | |

OTHER PUBLICATIONS

Office Action dated Jan. 29, 2020, issued in counterpart JP application No. 2018-065432, with English translation. (6 pages).

* cited by examiner

*Primary Examiner* — Dennis H Pedder
(74) *Attorney, Agent, or Firm* — Westerman, Hattori, Daniels & Adrian, LLP (57) ABSTRACT

A front seat 31 is foldable such that a seat back 33 is frontwardly collapsed and placed on a seat cushion 32, a rear seat 39 is foldable such that a seat back 41 is frontwardly collapsed and placed on a seat cushion 40, and a trunk floor 53 extending from a front pillar 12 to a rear pillar 14 is formable by laying a trunk board 49 across a gap formed between a rear face of the seat back 33 of the front seat 31 and a rear face of the seat back 41 of the rear seat 39 with the front seat 31 and the rear seat 39 in a folded state.

12 Claims, 7 Drawing Sheets

FLOOR STRUCTURE FOR AUTOMOBILE

CROSS-REFERENCE OF RELATED APPLICATION

This application claims priority of Japanese Patent Application No. 2018-065432 filed in Japan on Mar. 29, 2018, the entire contents of which are incorporated herein by reference.

TECHNICAL FIELD

The present invention relates to a floor structure of an automobile in which a door opening where a front door and a rear door are arranged is partitioned by a side sill, a front pillar, a roof side rail, and a rear pillar, while a front seat and a rear seat are arranged on a floor panel connecting the right and left side sills.

BACKGROUND OF THE INVENTION

Japanese Patent No. 5716605 describes a seat device of an automobile in which a seat cushion of a rear seat of an automobile is raised toward the outer side in the vehicle width direction, and a seat back is collapsed frontward and stored in a space where the seat cushion was placed, to thereby form a large trunk floor in a rear part of a vehicle body. The document also mentions that the automobile does not have a center pillar, and may have a door opening common to a front door and a rear door.

Incidentally, the conventional structure has a problem that the raised seat cushion of the rear seat narrows the dimension in the vehicle width direction of the trunk floor. Moreover, since the trunk floor is not formed in a position of a front seat, long luggage cannot be loaded, and the wide door opening common to the front door and the rear door cannot be used effectively for loading and unloading of luggage.

In view of the foregoing, there is a need to form a large trunk floor that enables easy loading and unloading of luggage in a vehicle compartment.

SUMMARY OF THE INVENTION

In a first embodiment according to the present invention, proposed is a floor structure of an automobile in which a door opening where a front door and a rear door are arranged is partitioned by a side sill, a front pillar, a roof side rail, and a rear pillar, while a front seat and a rear seat are arranged on a floor panel connecting the right and left side sills, characterized in that: the front seat is foldable such that a seat back is frontwardly collapsed and placed on a seat cushion; the rear seat is foldable such that a seat back is frontwardly collapsed and placed on a seat cushion; and a trunk floor extending from the front pillar to the rear pillar is formable by laying a trunk board across a gap formed between a rear face of the seat back of the front seat and a rear face of the seat back of the rear seat with the front seat and the rear seat in a folded state.

According to a second embodiment, proposed is a floor structure of an automobile characterized in that: in addition to the configuration of the first embodiment, the floor panel includes a first cross member, a second cross member, a third cross member, and a fourth cross member in this order from front to rear; the front seat has front and rear leg portions supported by the second cross member and the third cross member, respectively; the rear seat has front and rear leg portions supported by a first reinforcement portion between the third cross member and the fourth cross member and the fourth cross member, respectively; and the front seat in the folded state is supported by the first cross member or a second reinforcement portion between the first cross member and the second cross member.

According to a third embodiment, proposed is a floor structure of an automobile characterized in that: in addition to the configuration of the first embodiment, the front door is openably supported by the front pillar through a hinge; and the rear door is slidably supported by upper and lower rails provided in the roof side rail and the side sill.

According to a fourth embodiment, proposed is a floor structure of an automobile characterized in that: in addition to the configuration of the first embodiment, belt locking portions for locking a luggage fixing belt are provided on an inner face in the vehicle width direction of the front pillar and inner and outer positions in the vehicle width direction in a rear part of the seat cushion of the front seat.

According to a fifth embodiment, proposed is a floor structure of an automobile characterized in that: in addition to the configuration of the first embodiment, any one of the front seat and the rear seat is configured to allow the seat back to collapse frontwardly and be placed on an upper face of the seat cushion.

According to a sixth embodiment, proposed is a floor structure of an automobile characterized in that: in addition to the configuration of the second embodiment, any one of the front seat and the rear seat is configured to allow the front leg portion and the rear leg portion to collapse frontwardly to place the seat cushion on an upper face of the floor panel.

Proposed is a floor structure of an automobile characterized in that any one of the front seat and the rear seat includes a first rotation axis for frontwardly collapsing the seat back, in an upper part of the rear leg portion, and also includes a second rotation axis for frontwardly collapsing the rear leg portion relative to the floor panel.

According to a seventh embodiment, proposed is a floor structure of an automobile characterized in that: in addition to the configuration of the fifth embodiment, any one of the front seat and the rear seat includes a third rotation axis for frontwardly collapsing the front leg portion relative to the floor panel.

According to a seventh embodiment, proposed is a floor structure of an automobile characterized in that: in addition to the configuration of the second embodiment, the floor panel includes an upwardly bulging raised portion between the second cross member and the third cross member; and a fuel tank is placed below the raised portion.

According to an eighth embodiment, proposed is a floor structure of an automobile characterized in that: in addition to the configuration of the second embodiment, a trunk floor portion forming a part of the trunk floor is formed in a rear face of the rear leg portion of the front seat; a board supporting face supporting a front part of the trunk board is formed in a bracket supporting the rear leg portion; and a board supporting face supporting a rear part of the trunk board is formed in a rear face of the seat back of the rear seat.

According to a ninth embodiment, proposed is a floor structure of an automobile characterized in that: in addition to the configuration of the first embodiment, a reinforcing metal plate is provided inside the seat backs of the front seat and the rear seat forming a part of the trunk floor.

According to a tenth embodiment, proposed is a floor structure of an automobile characterized in that: in addition to the configuration of the first embodiment, the roof side rail has a closed section formed of an outer panel, an inner panel, and a stiffener; an outer end in the vehicle width direction of a roof arch supporting a roof panel is supported by the inner panel; and an outer end in the vehicle width direction of the roof panel is supported by the outer panel.

According to a eleventh embodiment, proposed is a floor structure of an automobile characterized in that: in addition to the configuration of the first embodiment, a dashboard lower rising from a front part of the floor panel is provided; and the dashboard lower includes a stepped portion having substantially the same height as the trunk floor.

According to a twelfth embodiment, proposed is a floor structure of an automobile characterized in that: in addition to the configuration of the first embodiment, a rear floor bulging from a rear part of the floor panel is provided; and the rear floor includes a flat portion having substantially the same height as the trunk floor.

Note that the front leg portion 35, the rear leg portion 36, the front leg portion 43, and the rear leg portion 44 of the embodiment correspond to the leg portion of the present invention.

EFFECT OF THE INVENTION

According to the configuration of the first embodiment, a door opening where a front door and a rear door are arranged is partitioned by a side sill, a front pillar, a roof side rail, and a rear pillar to obtain a wide door opening without a center pillar. Also, a front seat and a rear seat are arranged on a floor panel connecting the right and left side sills so as to face the door opening. The front seat is foldable such that a seat back is frontwardly collapsed and placed on a seat cushion, the rear seat is foldable such that a seat back is frontwardly collapsed and placed on a seat cushion, and a trunk floor extending from the front pillar to the rear pillar is formable by laying a trunk board across a gap formed between a rear face of the seat back of the front seat and a rear face of the seat back of the rear seat with the front seat and the rear seat in a folded state so as to face the wide door opening. Hence, not only can a large trunk floor be formed in a vehicle compartment to load a large amount of luggage, but also luggage can be loaded and unloaded easily through a wide door opening without a center pillar.

According to the configuration of the second embodiment, the floor panel includes a first cross member, a second cross member, a third cross member, and a fourth cross member in this order from front to rear, the front seat has front and rear leg portions supported by the second cross member and the third cross member, respectively, the rear seat has front and rear leg portions supported by a first reinforcement portion between the third cross member and the fourth cross member and the fourth cross member, respectively, and the front seat in the folded state is supported by the first cross member or a second reinforcement portion between the first cross member and the second cross member. Hence, not only can the front seat and the rear seat by supported firmly on the floor panel, but also the weight of heavy luggage loaded on the folded front seat can be supported securely.

According to the configuration of the third embodiment, the front door is openably supported by the front pillar through a hinge, and the rear door is slidably supported by upper and lower rails provided in the roof side rail and the side sill. Hence, luggage can be loaded and unloaded even more easily by opening the door opening widely by opening the front door to the front and opening the rear door to the rear.

According to the configuration of the fourth embodiment, belt locking portions for locking a luggage fixing belt are provided on an inner face in the vehicle width direction of the front pillar and inner and outer positions in the vehicle width direction in a rear part of the seat cushion of the front seat. Hence, by restraining a front part of long luggage to the belt locking portions with the luggage fixing belt, the luggage can be prevented from falling from the door opening even without a center pillar.

According to the configuration of the fifth embodiment, any one of the front seat and the rear seat is configured to allow the seat back to collapse frontwardly and be placed on an upper face of the seat cushion. Hence, a trunk floor can be formed by the rear face of the folded seat back.

According to the configuration of the sixth embodiment, any one of the front seat and the rear seat is configured to allow the front leg portion and the rear leg portion to collapse frontwardly to place the seat cushion on an upper face of the floor panel. Hence, the luggage loading capacity can be increased by lowering the trunk floor and expanding the vehicle compartment space. Additionally, since the trunk floor can be kept low even after placing the seats, luggage can be loaded and unloaded easily.

According to the configuration of the seventh embodiment, the floor panel includes an upwardly bulging raised portion between the second cross member and the third cross member, and a fuel tank is placed below the raised portion. Hence, not only can the capacity of the fuel tank be increased while keeping the height of the floor panel low, but also the sectional area of the second cross member and the third cross member can be increased to enhance mounting stiffness of the front seat.

According to the configuration of the eighth embodiment, a trunk floor portion forming a part of the trunk floor is formed in a rear face of the rear leg portion of the front seat, a board supporting face supporting a front part of the trunk board is formed in a bracket supporting the rear leg portion, and a board supporting face supporting a rear part of the trunk board is formed in a rear face of the seat back of the rear seat. Hence, a flat trunk floor extending from the front seat to the rear seat can be formed.

According to the configuration of the ninth embodiment, a reinforcing metal plate is provided inside the seat backs of the front seat and the rear seat forming a part of the trunk floor. Hence, even when heavy luggage is loaded on the folded front seat and rear seat, deformation of the front seat and rear seat can be prevented.

According to the configuration of the tenth embodiment, the roof side rail has a closed section formed of an outer panel, an inner panel, and a stiffener, an outer end in the vehicle width direction of a roof arch supporting a roof panel is supported by the inner panel, and an outer end in the vehicle width direction of the roof panel is supported by the outer panel. Hence, in a part of a roof on the outer side in the vehicle width direction, the roof panel can be projected further to the outer side in the vehicle width direction than the roof arch, whereby the vehicle compartment space can be expanded.

According to the configuration of the eleventh embodiment, a dashboard lower rising from a front part of the floor panel is provided, and the dashboard lower includes a stepped portion having substantially the same height as the trunk floor. Hence, the trunk floor can be extended to the front by the stepped portion of the dashboard lower.

According to the configuration of the twelfth embodiment, a rear floor bulging from a rear part of the floor panel is provided, and the rear floor includes a flat portion having substantially the same height as the trunk floor. Hence, the trunk floor can be extended to the rear by the flat portion of the rear floor.

DETAILED DESCRIPTION OF EMBODIMENTS OF THE INVENTION

Hereinafter, an embodiment of the present invention will be described with reference to FIGS. 1 to 7. Note that the longitudinal direction, the transverse direction (vehicle width direction), and the vertical direction in the specification are defined on the basis of an occupant seated in a driver's seat.

Figure 1:
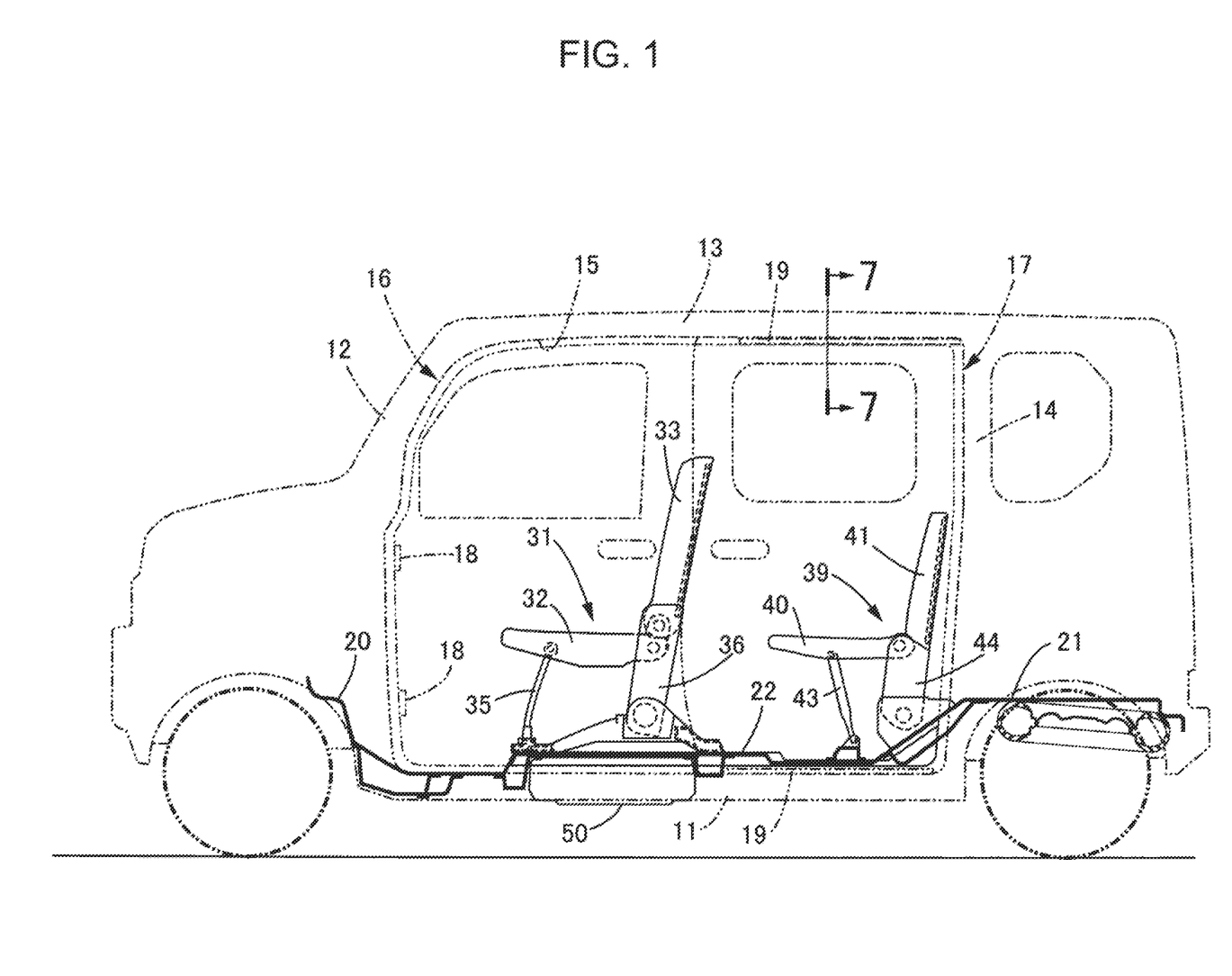
FIG. 1 is a side view of a vehicle body of an automobile in which seats are raised.

As shown in FIG. 1, an automobile of the embodiment has a door opening 15 surrounded by a side sill 11, a front pillar 12, a roof side rail 13, and a rear pillar 14. A front part of a left front door 16 is pivotally supported by the front pillar 12 through hinges 18, 18, while an upper part and a lower part of a left rear door 17 are slidably supported by rails 19, 19 provided in the roof side rail 13 and the side sill 11. The door opening 15 common to the front door 16 and the rear door 17 does not have a center pillar.

Figure 2:
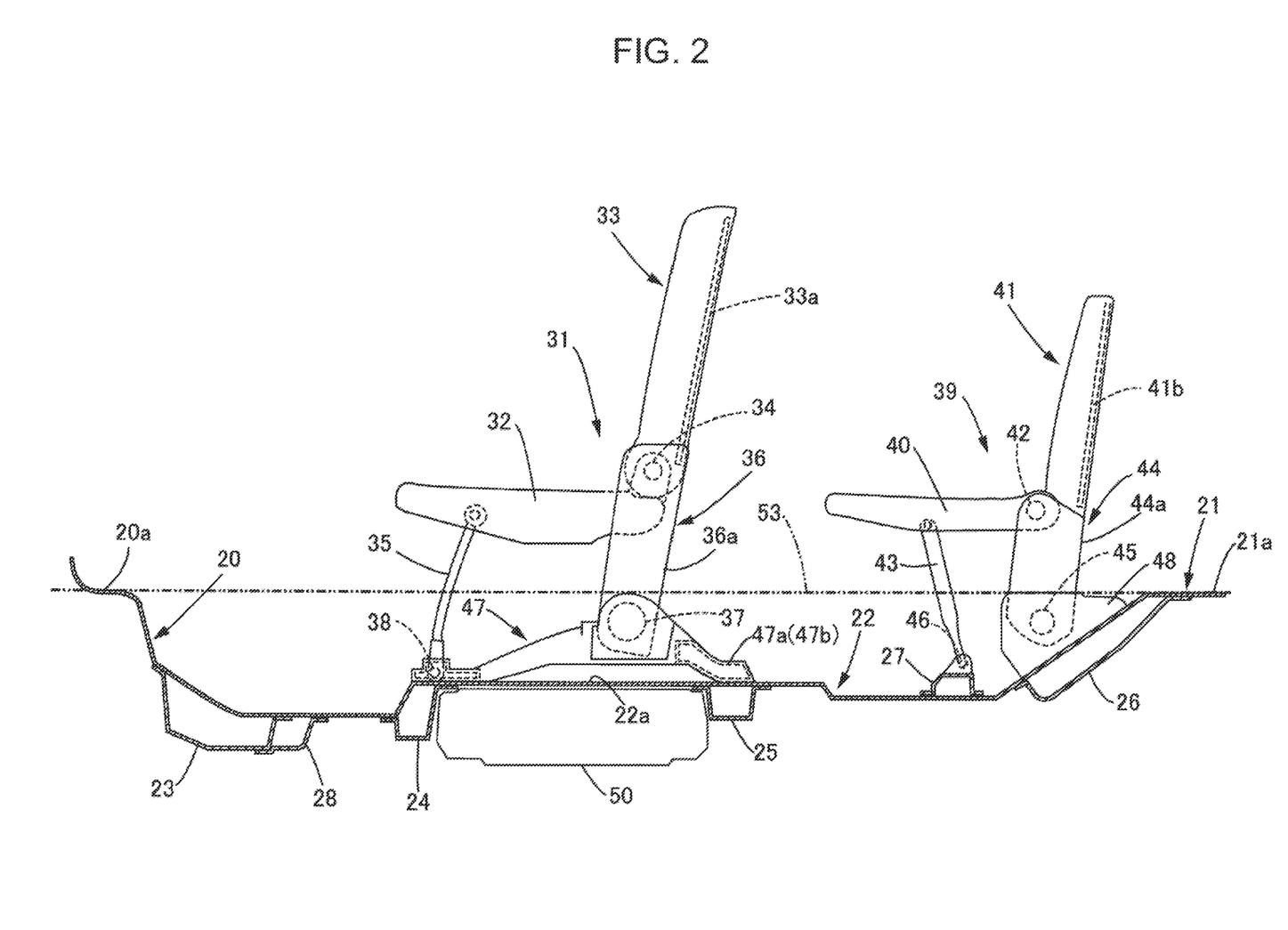
FIG. 2 is an enlarged view of a main part of FIG. 1.
Figure 3:
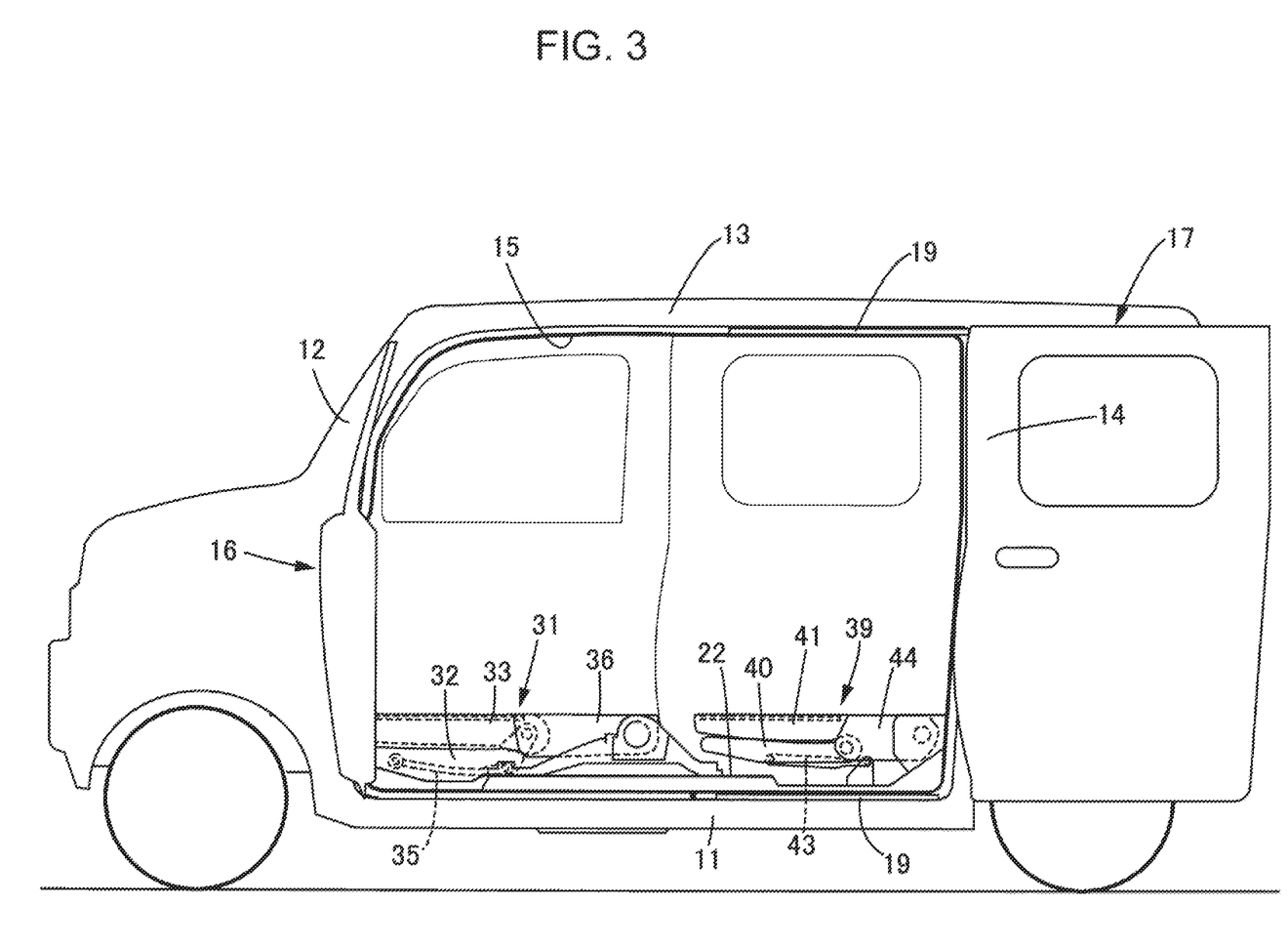
FIG. 3 is a side view of the vehicle body of the automobile in which the seats are folded.
Figure 4:
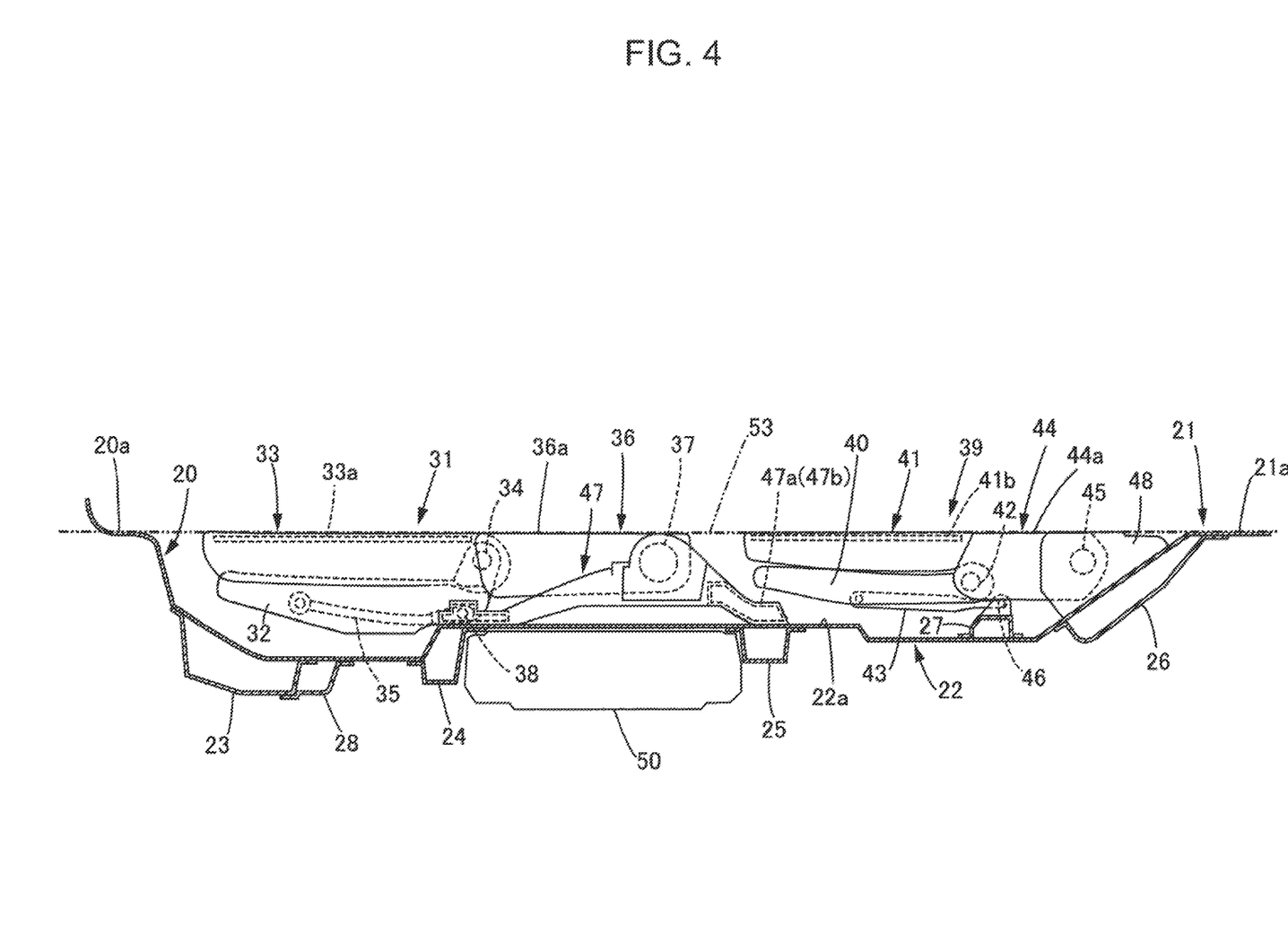
FIG. 4 is an enlarged view of a main part of FIG. 3.

As shown in FIGS. 2 and 4, a floor panel 22 is arranged in such a manner as to connect a dashboard lower 20 in a front part of the vehicle body and a rear floor 21 in a rear part of the vehicle body. On a lower face of the floor panel 22, a first cross member 23, a second cross member 24, a third cross member 25, and a fourth cross member 26 are placed in the vehicle width direction in this order from the front to rear. A first reinforcement portion 27 extending in the vehicle width direction is formed on an upper face of the floor panel 22 sandwiched between the third cross member 25 and the fourth cross member 26, and a second reinforcement portion 28 extending in the vehicle width direction is formed on a lower face of the floor panel 22 sandwiched between the first cross member 23 and the second cross member 24.

A left front seat 31 which is a passenger's seat includes a seat cushion 32, a seat back 33 that can be raised and collapsed in the longitudinal direction through a first rotation axis 34 provided on the rear end of the seat cushion 32, a front leg portion 35, and a rear leg portion 36. The lower end of the rear leg portion 36 is supported to a bracket 47 fixed so as to straddle the second cross member 24 and the third cross member 25, so that the rear leg portion can be raised and collapsed in the longitudinal direction through a second rotation axis 37. The upper end of the rear leg portion 36 is connected to the rear end of the seat cushion 32 and the lower end of the seat back 33 through the first rotation axis 34. The lower end of the front leg portion 35 is supported to the second cross member 24, so that the front leg portion can be raised and collapsed in the longitudinal direction through a third rotation axis 38. A metal plate 33a is embedded in the seat back 33 of the front seat 31. Note that the metal plate 33a may be exposed instead of being embedded.

A rear seat 39 includes a right and left pair of seat cushions 40, 40, a right and left pair of seat backs 41, 41, front leg portions 43, 43, and rear leg portions 44, 44 integrated with the seat backs 41, 41. The rear ends of the seat cushions 40, 40 are connected to the upper ends of the rear leg portions 44, 44 through first rotation axes 42, 42, and the lower ends of the rear leg portions 44, 44 are supported to brackets 48, 48 fixed to the fourth cross member 26, so that the rear leg portions can be raised and collapsed in the longitudinal direction through second rotation axes 45, 45. The lower ends of the front leg portions 43, 43 are supported to the first reinforcement portion 27, so that the front leg portions can be raised and collapsed in the longitudinal direction through third rotation axes 46, 46. Metal plates 41b, 41b are embedded in the seat backs 41, 41 of the rear seat 39. Note that the metal plate 41b may be exposed instead of being embedded.

A flat trunk floor portion 36a is formed on a rear face (upper face in a collapsed state) of the rear leg portion 36 of the front seat 31, and board supporting faces 47a, 47b are formed in the bracket 47. A plate-shaped trunk board 49 can be placed on the board supporting faces 47a, 47b of the bracket 47 and a board supporting face 41a formed on an upper rear face (upper face in a collapsed state) of the left seat back 41 of the rear seat 39 such that the plate-shaped trunk board 49 extends therebetween and bridges the seat backs in the horizontal direction. When the trunk board 49 is not used, the trunk board 49 can be stored below the seat cushion 32 or the seat cushion 40.

The floor panel 22 between the second cross member 24 and the third cross member 25 forms an upwardly bulging raised portion 22a, and a fuel tank 50 is stored in the raised portion 22a. A horizontal stepped portion 20a is formed in the dashboard lower 20 inclined upward toward the front, and a horizontal flat portion 21a is formed in the rear floor 21 inclined upward toward the rear.

Figure 6:
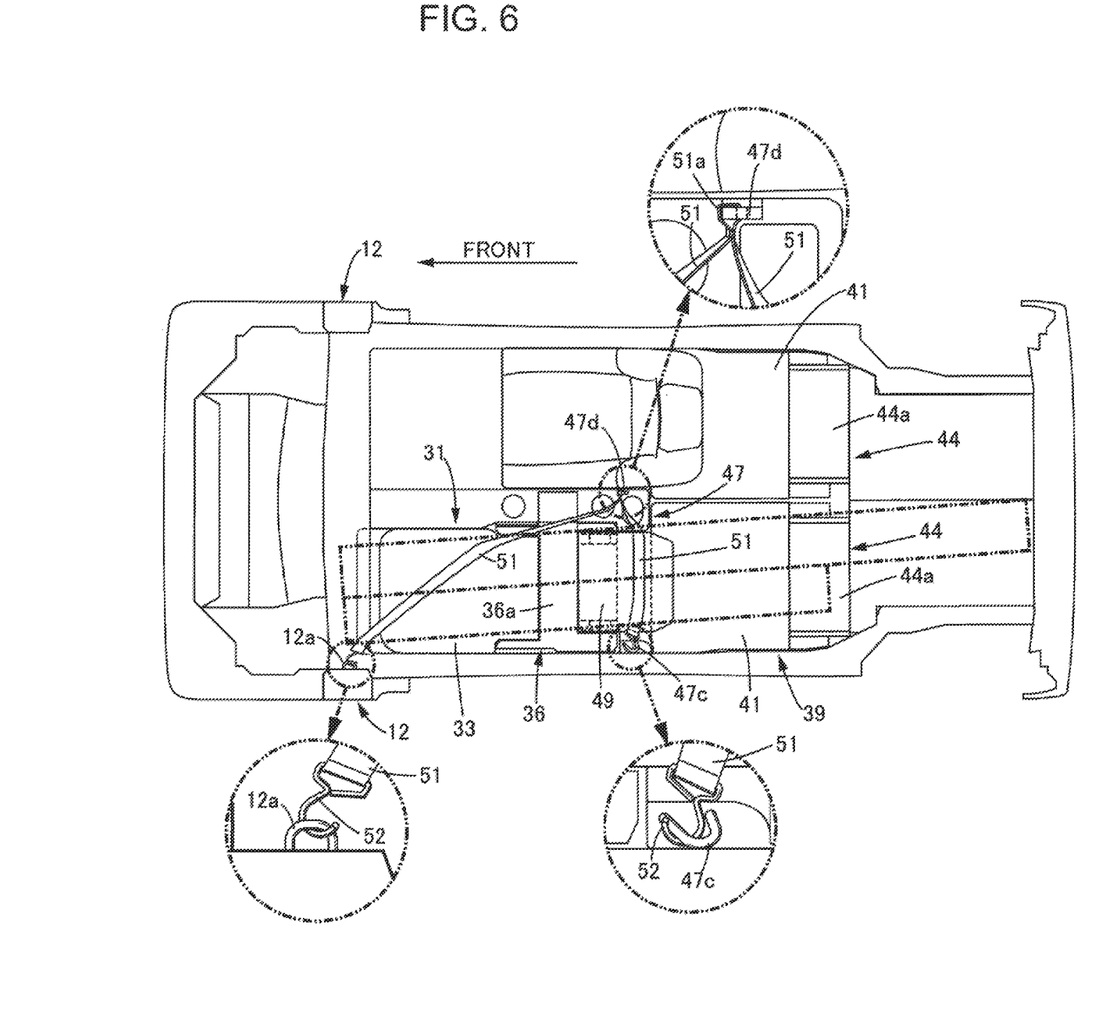
FIG. 6 is a view on arrow 6 of FIG. 4.

As shown in FIG. 6, a U-shaped belt locking portion 12a is provided on an inner face in the vehicle width direction of a lower part of the left front pillar 12, and U-shaped belt locking portions 47c, 47d are provided on both right and left side parts of the bracket 47 supporting the seat cushion 32 of the left front seat 31. A loop portion 51a provided in an intermediate part of a luggage fixing belt 51, and hooks 52, 52 provided on both end parts of the luggage fixing belt are locked onto the belt locking portions 12a, 47c, and 47d. Note that the loop portion 51a may be changed to the hook 52.

Figure 5:
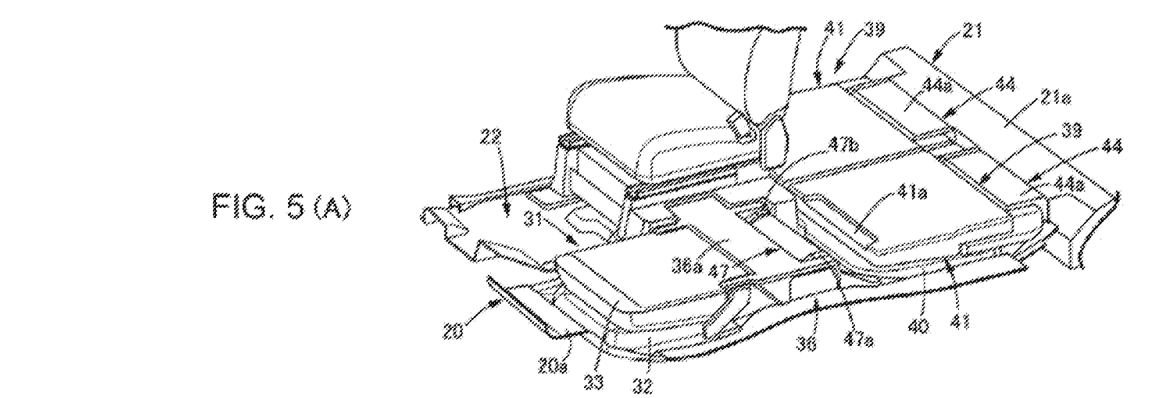
FIGS. 5(A) and 5(B) are perspective views of a state where the seat is raised and a state where the seat is folded.

As shown in FIG. 4 and part (B) of FIG. 5, when the front seat 31 and the rear seat 39 configured in the above manner are folded, a flat trunk floor 53 is formed above the floor panel 22. In part (B) of FIG. 5, the trunk floor 53 is surrounded by a thick chain line.

Figure 7:
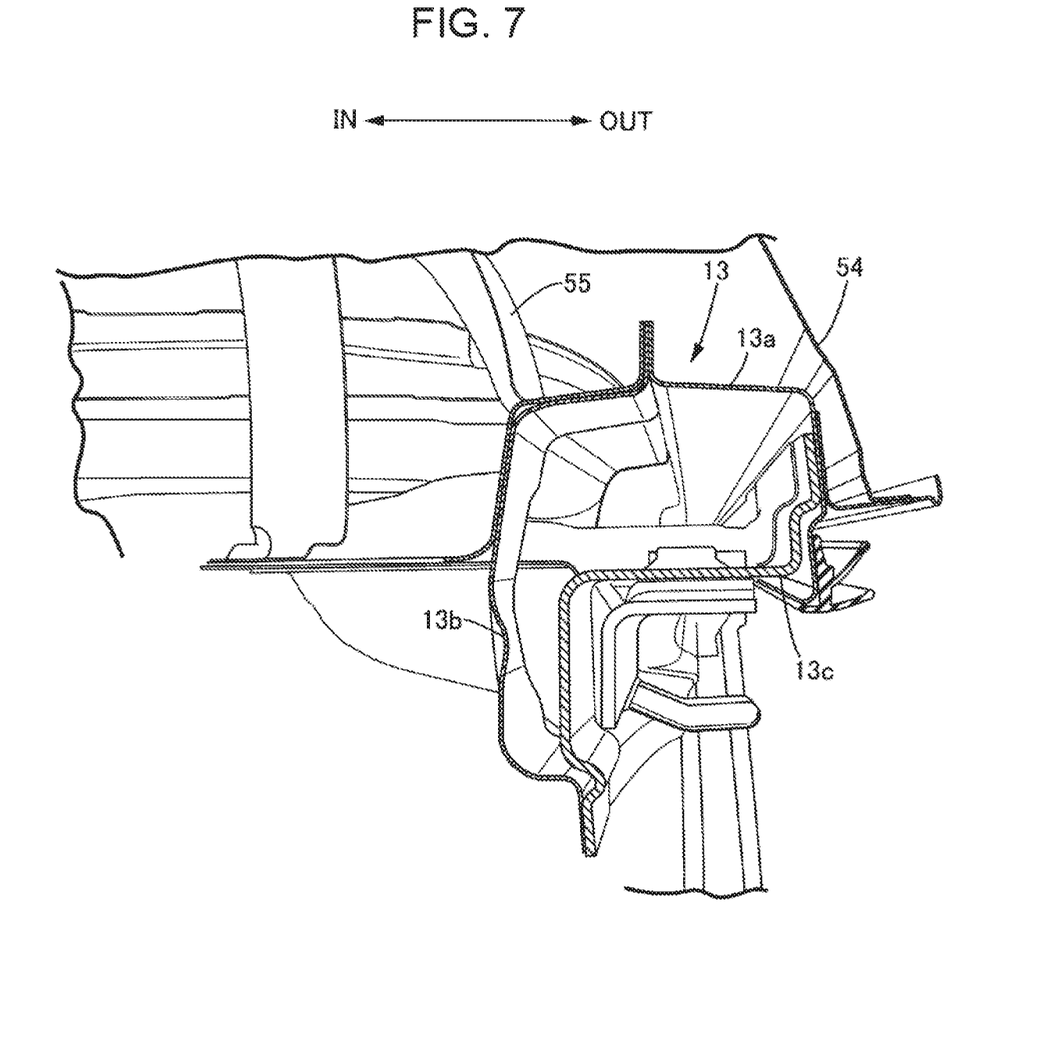
FIG. 7 is an enlarged cross-sectional view taken along line 7-7 of FIG. 1.

As shown in FIG. 7, the roof side rail 13 is formed into a closed section by combining an outer panel 13a, an inner panel 13b, and a stiffener 13c. The outer end in the vehicle width direction of a roof arch 55 supporting a roof panel 54 is supported by the inner panel 13b of the roof side rail 13, and the outer end in the vehicle width direction of the roof panel 54 is supported by the outer panel 13a of the roof side rail 13.

Next, effects of the embodiment of the present invention configured in the above manner will be described.

The left front seat 31 is firmly attached onto the floor panel 22, by supporting the lower end of the rear leg portion 36 to the bracket 47 fixed so as to straddle the second cross member 24 and the third cross member 25, and supporting the lower end of the front leg portion 35 to the second cross member 24. The rear seat 39 is firmly attached onto the floor panel 22 by supporting the lower ends of the rear leg portions 44, 44 to the brackets 48, 48 fixed to the fourth cross member 26, and supporting the lower ends of the front leg portions 43, 43 to the first reinforcement portion 27.

In order to form the trunk floor 53 in the vehicle compartment, the rear leg portion 36 and the front leg portion 35 supporting the seat cushion 32 of the front seat 31 are collapsed frontward around the second rotation axis 37 and the third rotation axis 38, to place the seat back 33 on the seat cushion 32 and place the seat cushion 32 on the floor panel 22. Furthermore, the rear leg portions 44, 44 and the front leg portions 43, 43 of the rear seat 39 are collapsed frontward around the second rotation axes 45, 45 and the third rotation axes 46, 46, to place the seat backs 41, 41 on upper faces of the seat cushions 40, 40 and place the seat cushions 40, 40 on the floor panel 22. Then, the trunk board 49 is placed on the board supporting faces 47a, 47b of the bracket 47 of the front seat 31 and the board supporting face 41a on the rear face of the left seat back 41 of the rear seat 39, to bridge across a gap formed between the collapsed seat back 33 of the front seat 31 and the collapsed left seat back 41 of the rear seat 39.

In this state, a rear face of the seat back 33 of the front seat 31, the trunk floor portion 36a of the rear leg portion 36 of the front seat 31, the trunk board 49, the rear face of the seat back 41 of the rear seat 39, and a trunk floor portion 44a of the rear leg portion 44 of the rear seat 39 are aligned at the same height, whereby the flat trunk floor 53 is formed. At this time, the stepped portion 20a of the dashboard lower 20 is continuous with the front end of the trunk floor 53 and the flat portion 21a of the rear floor 21 is continuous with the rear end of the trunk floor 53, so that the substantial longitudinal dimension of the trunk floor 53 is extended.

Although luggage is placed on an upper face of the seat back 33 of the folded front seat 31 and upper faces of the seat backs 41, 41 of the folded rear seat 39, since the metal plates 33a and 41b, 41b are embedded in the seat back 33 of the front seat 31 and the seat backs 41, 41 of the rear seat 39, the metal plates 33a and 41b, 41b can support the weight of the luggage and prevent deformation of the front seat 31 and the rear seat 39. Additionally, since a front part of the seat back 33 of the folded front seat 31 is supported by the first cross member 23 and the second reinforcement portion 28 between the first cross member 23 and the second cross member 24, the weight of luggage placed on the upper face of the seat back 33 of the front seat 31 can be supported securely. Note that in FIG. 4, lower face shapes of front parts of the seat cushion 32 and the seat cushion 40 that come into contact with the floor panel 22 are omitted.

The door opening 15 surrounded by the side sill 11, the front pillar 12, the roof side rail 13, and the rear pillar 14 does not include a center pillar, the front part of the front door 16 is pivotally supported by the front pillar 12 through hinges 18, 18, and the rear door 17 is a slide door slidably supported by the rails 19, 19 provided in the roof side rail 13 and the side sill 11. Accordingly, the trunk floor 53 faces the wide door opening 15, so that even large luggage can be loaded and unloaded easily.

Moreover, when long luggage such as a rolled carpet is loaded over the entire length of the trunk floor 53, a front part of the long luggage may be restrained by the luggage fixing belt 51 having the loop portion 51a and the hooks 52, 52 hooked onto the belt locking portion 12a provided in the front pillar 12 and the belt locking portions 47c, 47d provided on inner and outer positions in the vehicle width direction of the bracket 47 supporting the rear leg portion 36 of the front seat 31. This can prevent the luggage from falling from the door opening 15.

In addition, the floor panel 22 has the upwardly bulging raised portion 22a between the second cross member 24 and the third cross member 25, and the fuel tank 50 is stored in the raised portion 22a. Hence, not only can the capacity of the fuel tank 50 be increased while keeping the height of the floor panel 22 low, but also the sectional area of the second cross member 24 and the third cross member 25 can be increased to enhance mounting stiffness of the front seat 31.

Furthermore, the roof side rail 13 is formed into a closed section by the outer panel 13a, the inner panel 13b, and the stiffener 13c, the outer end in the vehicle width direction of the roof arch 55 supporting the roof panel 54 is supported by the inner panel 13b, and the outer end in the vehicle width direction of the roof panel 54 is supported by the outer panel 13a. Hence, in a part of the roof on the outer side in the vehicle width direction, the roof panel 54 is positioned higher and on the outer side in the vehicle width direction of the roof arch 55, whereby the vehicle compartment space can be expanded.

Although the embodiment of the present invention has been described, various design changes may be made in the invention, without departing from the gist of the invention.

For example, although the trunk floor 53 is formed between the front seat 31 and the rear seat 39 on the left side in the embodiment, a trunk floor may be formed between the front seat and the rear seat on the right side.

The invention claimed is:
1. A floor structure of an automobile, comprising:
a door opening in which a front door and a rear door are arranged, the door opening being framed by a front pillar, a roof side rail, a rear pillar, and one of right and left side sills;
a floor panel in which a front seat and a rear seat are arranged, the floor panel connecting said right and left side sills;
said front seat comprising a front seat back and a front seat cushion and configured to be foldable by inclining the front seat back frontwardly and placing the front seat back on the front seat cushion;
said rear seat comprising a rear seat back and a rear seat cushion and configured to be foldable by inclining the rear seat back frontwardly and placing the rear seat back on the rear seat cushion;
a gap formable between a back surface of the front seat back of said front seat and a back surface of the rear seat back of said rear seat when each of said front seat and said rear seat is in a folded state; and
a trunk board capable of being laid across the gap such that a trunk floor extending from said front pillar to said rear pillar is formed in said folded state.

2. The floor structure of the automobile according to claim 1, wherein
said floor panel comprises a first cross member, a second cross member, a third cross member, and a fourth cross member in this order from front to rear,
said front seat has front and rear leg portions supported by said second cross member and said third cross member, respectively,
said rear seat has front and rear leg portions supported by a first reinforcement portion between said third cross member and said fourth cross member and said fourth cross member, respectively, and said front seat in the folded state is supported by said first cross member or a second reinforcement portion between said first cross member and said second cross member.

3. The floor structure of the automobile according to claim 1, wherein
said front door is openably supported by said front pillar through a hinge, and
said rear door is slidably supported by upper and lower rails provided in said roof side rail and said side sill.

4. The floor structure of the automobile according to claim 1, further comprising:
a luggage fixing belt; and
belt locking portions configured to lock the luggage fixing belt at an inner face position in the vehicle width direction of said front pillar and inner and outer positions in the vehicle width direction in a rear part of the seat cushion of said front seat.

5. The floor structure of the automobile according to claim 1, wherein
any one of said front seat and said rear seat is configured to allow said seat back to collapse frontwardly and be placed on an upper face of said seat cushion.

6. The floor structure of the automobile according to claim 2, wherein
any one of said front seat and said rear seat has front leg portion and rear leg portion which are configured to collapse frontwardly to place said seat cushion on an upper face of said floor panel.

7. The floor structure of the automobile according to claim 2, wherein
said floor panel comprises an upwardly bulging raised portion between said second cross member and said third cross member, and
a fuel tank is placed below said raised portion.

8. The floor structure of the automobile according to claim 2, wherein
a trunk floor portion forming a part of said trunk floor is formed in a rear face of said rear leg portion of said front seat,
a board supporting face supporting a front part of said trunk board is formed in a bracket supporting said rear leg portion, and
a board supporting face supporting a rear part of said trunk board is formed in a rear face of the seat back of said rear seat.

9. The floor structure of the automobile according to claim 1, wherein
a reinforcing metal plate is provided inside the seat backs of said front seat and said rear seat forming a part of said trunk floor.

10. The floor structure of the automobile according to claim 1, wherein
said roof side rail has a closed section formed of an outer panel, an inner panel, and a stiffener,
an outer end in the vehicle width direction of a roof arch supporting a roof panel is supported by said inner panel, and
an outer end in the vehicle width direction of said roof panel is supported by said outer panel.

11. The floor structure of the automobile according to claim 1, further comprising a dashboard lower rising from a front part of said floor panel, wherein
said dashboard lower comprises a stepped portion having substantially the same height as said trunk floor.

12. The floor structure of the automobile according to claim 1, further comprising a rear floor bulging from a rear part of said floor panel, wherein
said rear floor comprises a flat portion having substantially the same height as said trunk floor.

* * * * *